(12) United States Patent
Haddock

(10) Patent No.: US 6,970,426 B1
(45) Date of Patent: Nov. 29, 2005

(54) RATE COLOR MARKER

(75) Inventor: Stephen R. Haddock, La Honda, CA (US)

(73) Assignee: Extreme Networks, Santa Clara, CA (US)

( * ) Notice: Subject to any disclaimer, the term of this patent is extended or adjusted under 35 U.S.C. 154(b) by 355 days.

(21) Appl. No.: 10/438,899

(22) Filed: May 14, 2003

(51) Int. Cl.[7] .......................... H04J 1/16; G06F 15/173
(52) U.S. Cl. .................. 370/235.1; 370/233; 370/252; 370/389; 709/233; 709/238
(58) Field of Search .............................. 370/235, 236, 370/252, 229, 230, 233, 389; 709/230, 235, 709/238; 701/201; 358/500; 379/114.08, 379/221.07

(56) References Cited

U.S. PATENT DOCUMENTS

| | | | |
|---|---|---|---|
| 6,748,435 B1 | 6/2004 | Wang et al. | |
| 6,820,128 B1 | 11/2004 | Firoiu et al. | |
| 6,829,643 B1 | 12/2004 | Tobe et al. | |
| 6,839,327 B1 | 1/2005 | Zavalkovsky et al. | |
| 6,842,788 B1 | 1/2005 | Ghanwani et al. | |
| 2002/0031089 A1 * | 3/2002 | Elloumi et al. | 370/235 |
| 2002/0031091 A1 | 3/2002 | van Everdingen | |
| 2002/0087715 A1 | 7/2002 | De Cnodder et al. | |
| 2002/0107908 A1 | 8/2002 | Dharanikota | |
| 2003/0012144 A1 | 1/2003 | Nichols | |
| 2004/0100901 A1 | 5/2004 | Bellows | |
| 2004/0125796 A1 | 7/2004 | Reader | |
| 2004/0177087 A1 | 9/2004 | Wu et al. | |
| 2004/0208125 A1 | 10/2004 | Damon et al. | |
| 2004/0221032 A1 | 11/2004 | Bernstein et al. | |
| 2005/0002377 A1 | 1/2005 | De Boeck | |

FOREIGN PATENT DOCUMENTS

| | | |
|---|---|---|
| EP | 1220439 A1 | 7/2002 |
| EP | 1220493 A1 | 7/2002 |

OTHER PUBLICATIONS

Heinanen, J. and R. Guerin; A Two Rate Three Color Marker, RFC 2698, Sep. 1999.*

(Continued)

*Primary Examiner*—Afsar Qureshi
(74) *Attorney, Agent, or Firm*—Blakely, Sokoloff, Taylor & Zafman LLP

(57) ABSTRACT

A metering device has a first token bucket with a profile, a rate, and a maximum number of tokens. The device has another token bucket with its own profile, two associated rates, and a maximum number of tokens. In operation, the device monotonically increments the number of tokens in the first token bucket at its rate if the bucket has less than the maximum number of tokens for that bucket, and monotonically increments the number of tokens in the other token bucket at the same rate if the first token bucket is full and the other token bucket is not. Additionally, the device monotonically increments the number of tokens in the second token bucket according to the second rate associated with the token bucket if it is not full. When receiving a packet of size s data units, if the packet has a first marking, and the first token bucket has at least s tokens, the packet's marking is maintained and the number of tokens in the first bucket is decremented by s, else, if the packet has one of two markings, and the second token bucket has at least s tokens, the packet's second marking is selected and the second token bucket is decremented by s, else, if the packet has a marking other than one of the two markings, the packet's marking is maintained as other than one of the two markings.

51 Claims, 2 Drawing Sheets

OTHER PUBLICATIONS

Klessig, Bob; Alternative 2 Rate, 3 Color Metering; Proposal to Metro Ethernet Forum, Apr. 3, 2003.
Figueira, Norival; RFC2698 and New Proposal (in color blind mode); Proposal to Metro Ethernet Forum, Apr. 29, 2003.
Zeitak, Reuven; RFC 2698 Policing Versus New Proposal; Proposal to Metro Ehternet Forum, May 8, 2003.
Wang, Zheng; Internet QoS Architectures and Mechanisms for Quality of Service; Bell Labs, Lucent Technology; Morgan Kaufmann Publishers.
Heinanen, J. and R. Guerin; A Single Rate Three Color Marker; RFC 2697, Sep., 1999.
Heinanen, J. and R. Guerin; A Two Rate Three Color Marker, RFC 2698, Sep., 1999.
UK Search Report, Application No. GB0410863.5, Oct. 6, 2004.
Heinanen, J. et al., "A Single Rate Three Color Marker," The Internet Society, Sep. 1999, pp. 1-4.
Heinanen, J. et al., "A Two Rate Three Color Marker," The Internet Society, Sep. 1999, pp. 1-5.
Andrikopoulos, Ilias et al., "A Fair Traffic Conditioner for the Assured Service in a Differentiated Services Internet," ICC 2000 (2000 IEEE International Conference on Communications), Conference Record vol. 2, Jun. 18-22, 2000, pp. 806-810.
Wang, Zheng, "Internet QoS: Architectures and Mechanisms for Quality of Service," Lucent Technologies, 2001, pp. 112-115.
Figueira, Norival, "RFC2698 and New Proposal (in color blind mode)," V0.3, Apr. 29, 2003, pp. 1-8.
Chang, Chung-Ju et al., "The Traffic Conditioner with Promotion and Fairness Guarantee Schemes for DiffServ Networks," ICC 2003 (2003 IEEE International Conference on Communications), Conference Record vol. 1, May 11-15, 2003, pp. 238-242.
Zhu, L. et al., "Local stability of random exponential marking," IEE Proc.-Commun, vol. 150, No. 5, Oct. 2003, pp. 367-370.
Su, H. et al., "Comprehensive performance model of differentiated service with token bucket marker," IEE Proc.-Commun, vol. 150, No. 5, Oct. 2003, pp. 347-353.
Klessig, Bob, "Alternative 2 Rate, 3 Color Metering," pp. 1-8.
Zeitak, Reuven, "RFC2698 Policing Versus New Proposal."

* cited by examiner

100

200

RATE COLOR MARKER

TECHNICAL FIELD

The present invention generally relates to the field of data communications. In particular, the present invention relates to a device metering a received data stream and marking packets in the data stream differently, for example, based on one factor, or a combination of one or more factors, such as packet rate, packet length, time of arrival of a packet in the data stream, etc. A packet may be marked, and remarked, for example, to indicate a level of assurance as to whether the packet is forwarded or discarded.

BACKGROUND

A rate color marker can meter packets in a traffic stream and mark the packets based on traffic parameters. Such metering and marking can be used to enable services such as quality of service or congestion control in communication networks. Two similar color rate markers are documented in Internet Engineering Task Force (IETF) Informational Request For Comments (RFC) 2697 and 2698. See Heinanen, J. and R. Guerin, "A Single Rate Three Color Marker", RFC 2697, September, 1999, and Heinanen, J. and R. Guerin, "A Two Rate Three Color Marker", RFC 2698, September, 1999.

The referenced RFCs describe color rate marker algorithms in the context of an Internet Protocol (IP)-based packet switched internetwork. However, such algorithms can be implemented in cell-switched networks as well. Each color marker meters a traffic stream, for example, an IP packet stream, and marks its packets one of green, yellow or red.

The Single Rate Three Color Marker (srTCM) described in RFC2697 marks packets in an IP stream based on a traffic rate, Committed Information Rate (CIR), and two different burst sizes, Committed Burst Size (CBS), and Excess Burst Size (EBS). In short, a packet is marked green if it does not exceed CBS, yellow if it does exceed CBS but does not exceed EBS, and red if it exceeds both CBS and EBS. srTCM is limited in that it uses the length, but not peak rate, of a burst of traffic to determine the color associated with the traffic. A service, or a level of service, is then provided to the traffic based on its color.

The Two Rate Three Color Marker (trTCM) described in RFC 2698 marks packets in an IP stream based on two different traffic rates, Peak Information Rate (PIR), and Committed Information Rate (CIR), and corresponding burst sizes Committed Burst Size (CBS) and Peak Information Burst (PBS). According to trTCM, a packet is marked red if it exceeds PIR, and if the packet does not exceed PIR, it is marked yellow or green depending on whether it exceeds CIR or does not exceed CIR. By making use of two rates, a peak traffic rate (or simply, peak rate), and a committed rate, trTCM is able to monitor peak rate traffic separate from committed rate traffic.

Both srTCM and trTCM contemplate a metering device that meters each packet in a traffic stream and forwards, or passes, the packet to a marker that colors the packet. Both algorithms operate in one of two modes, color-blind mode, in which the meter receives the traffic stream as if it is uncolored, and color-aware mode, in which packets in the received traffic stream are already colored ("pre-colored"), for example, one of colors green, yellow, and red. The details of the pre-coloring process and how the meter detects or determines the color of a packet is implementation specific and outside the scope of the RFCs as well as this invention. The RFCs disclose the marker recoloring a packet based on the results of the meter, and provide, as an example, coding the color as a codepoint in the DiffServ (DS) field of the packet in a per-hop behavior (PHB) specific manner, and refers one to IETF RFC2474 for further information. See Nichols, K., Blake, S., Baker, F. and D. Black, "Definition of the Differentiated Services Field (DS Field) in the IPv4 and IPv6 Headers", RFC 2474, December, 1998. The color can be coded as a drop precedence of the packet, according to RFC2597. See Blake, S., Black, D., Carlson, M., Davies, E., Wang, Z. and W. Weiss, "An Architecture for Differentiated Services", RFC 2475, December 1998.

Both color markers can mark packets in a traffic stream, for example, such that different levels of assurance are provided to packets based on whether the packets are green, yellow or red. Decreasing levels of service may be provided to green, then yellow, then red, packets. For example, green packets may be guaranteed delivery, or at least forwarded with a low probability of being discarded or dropped, while yellow packets may be forwarded on a best effort basis, and red packets dropped.

The srTCM meter operates in either color-blind or a color-aware mode, and uses two token buckets, C and E, into which tokens are added at the same rate, CIR. In an IP context, CIR is expressed in terms of bytes per second, more specifically, in terms of IP bytes per second. The token buckets initially are full, defined by CBS for token bucket C (hence the token bucket's name) and EBS for token bucket E (and hence its name). That is, the number of tokens, or simply, token count, is initially set to CBS and EBS for token buckets C and E, respectively. CBS and EBS are measured, for example, in bytes. Thus, in an IP network, typically the value of CBS or EBS is at least equal to the largest possible IP packet received by the meter. srTCM token buckets are depleted, that is, the token count is decremented, when processing received packets, wherein the number of bytes in the received packet determines whether and how much the token count is decremented. Both token buckets are filled with tokens at rate CIR: in token bucket C, tokens are added, that is, the token count Tc incremented, at rate CIR up to CBS, and the token count Te for token bucket E is also incremented at rate CIR up to EBS (only when Tc=CBS).

The trTCM meter also operates in color-blind and color-aware mode, and uses two token buckets, P and C, into which tokens are added at different rates, PIR and CIR. Both rates are also expressed in terms of IP bytes per second in an IP network context. The token buckets initially are full, defined by PBS for token bucket P and CBS for token bucket C. The relationship between PBS and CBS can be defined as follows:

$$PBS = CBS + EBS$$

trTCM token buckets are depleted, that is, the token count is decremented, when processing received packets, as in srTCM. However, the token buckets are filled with tokens at different rates. In token bucket P, tokens are added, that is, the token count Tp incremented, at rate PIR up to PBS, whereas the token count Tc for token bucket C is incremented at rate CIR up to CBS.

In color-aware mode, trTCM recolors a green packet green only when sufficient tokens are available in both token buckets C and P. This can lead to a situation in which a green packet is received and recolored red even though there are sufficient tokens in token bucket C, as can happen when token bucket P has insufficient tokens to process the green packet due to the previous processing of received yellow packets. When this situation arises, transmission of green packets cannot be guaranteed even when the green packets conform to a traffic profile defined by CBS and CIR. Thus, in some situations, a network service provider using trTCM is unable to guarantee transmission of green packets. This nondeterministic transmission of green packets by trTCM defeats one of the primary objects of color rate marking, which is provisioning a network that guarantees transmission of green packets.

One approach to solving this problem is to modify the trTCM algorithm as follows:

1) change the rate at which the token count is incremented, that is, the rate at which tokens are deposited, in token bucket P from PIR to PIR–CIR;
2) change the maximum size of token bucket P from PBS to PBS–CBS;
3) change the trTCM algorithm such that the availability of tokens in token bucket C is checked first; and
4) change the trTCM algorithm such that packets which will be marked green only remove tokens from token bucket C.

These modifications solve the original problem, but introduce a new one: in the absence of incoming green packets, the rate at which incoming yellow packets will be marked as yellow is limited to PIR-CIR instead of PIR. This can be a significant issue because when network bandwidth reserved for committed rate traffic goes unused, it cannot be reclaimed for use by peak rate traffic, resulting in underutilization of the network and, in the case of a network service provider that sells network bandwidth, lost revenue.

Another proposed solution to the RFC2698 problem is to allow green packets to borrow future tokens from token bucket P (which can cause the token count in token bucket P to become negative), thus preventing recoloring a green packet to red in the case where there are sufficient tokens in the token bucket C but not the token bucket P. This solution has two problems. The first problem is that if a PBS burst of yellow packets occurs, followed by a CBS burst of green packets, all packets will be passed as originally marked but the resultant combined burst will be of size PBS+CBS which violates the traffic profile. This can be addressed by reducing the size of token bucket P to PBS–CBS, or by keeping its size at PBS but reserving a CBS-size amount of Tp tokens for green packets. In any case, the second problem is that a conformant burst of yellow and green packets may result in some of the yellow packets being recolored red, depending on the sequence of the packets.

SUMMARY

A rate color marker algorithm that guarantees all packets received that are pre-colored green and conform to the traffic profile defined by CIR and CBS will be marked as green. The algorithm further provides for marking packets yellow up to a peak information rate, depending on the received packet stream, and can be configured to operate as a multirate, multicolor marker such as a one rate three color marker, or a one rate two color marker.

BRIEF DESCRIPTION OF THE DRAWINGS

The present invention is illustrated by way of example, and not by way of limitation, in the figures of the accompanying drawings in which.

DETAILED DESCRIPTION

Figure 1:
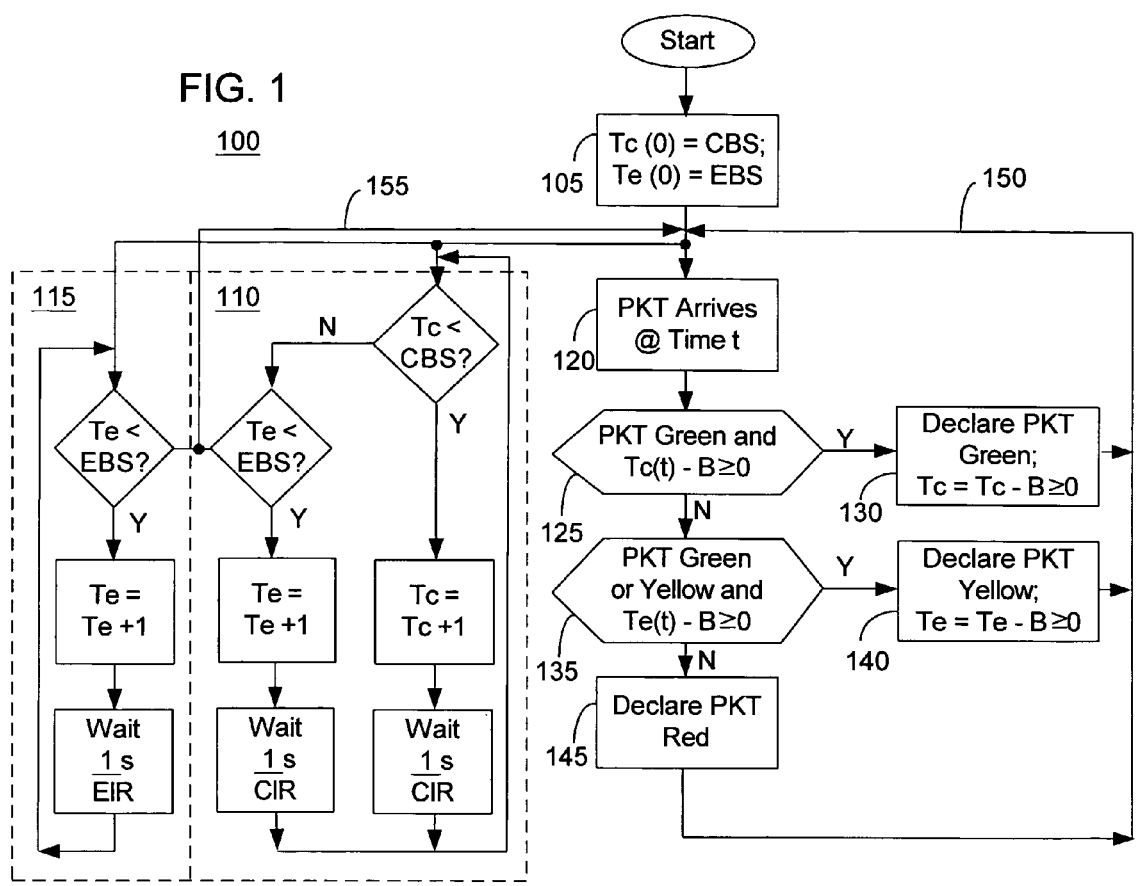
FIG. 1 provides a flow diagram of an embodiment of the invention.

The invention is a multiple rate multiple color marker, or simply, a rate color marker, having in one embodiment of the invention a token bucket for committed burst size packets, referred to herein as token bucket C, and a token bucket for excess burst size packets, referred to herein as token bucket E. The rate color marker comprises a meter that operates in either color-blind or a color-aware mode, and deposits tokens into token bucket C at rate CIR until token bucket C is full, and deposits tokens into token bucket E at rate CIR if token bucket C is full. Additionally, a separate source of tokens is provided for token bucket E. Tokens from the separate source are deposited into token bucket E at rate EIR, without considering whether token bucket C is full. The combination of the two sources of tokens for deposit in token bucket E, one source deposited at rate CIR if token bucket C is full and the other source deposited at EIR, provides an effective token deposit rate of PIR. (It should be noted that just as committed burst size (CBS) plus excess burst size (EBS) equals peak burst size (PBS), so too does committed information rate (CIR) plus excess information rate (EIR) equal peak information rate (PIR)).

As will be described more fully below, the invention overcomes the problem described above with respect to the trTCM algorithm set forth in RFC2698 because it guarantees that a burst of yellow packets will not cause conformant green packets to be recolored as red. An embodiment of the invention overcomes the problem of previously proposed modifications to the RFC 2698-based trTCM algorithm because in the absence of incoming green packets, a color rate marker in accordance with the invention will allow incoming yellow packets to be forwarded at a rate of PIR, not just PIR–CIR.

An embodiment of the invention further overcomes the new problems introduced by the proposed solution to the RFC2698 problem that allows green packets to borrow future tokens from token bucket P (which can cause the token count in token bucket P to become negative), thus preventing recoloring a green packet to red in the case where there are sufficient tokens in the token bucket C but not the token bucket P. An embodiment of the invention always limits the maximum burst size to PBS, and does not recolor a conformant burst of yellow and green packets regardless of the sequence of packets.

The invention has the added advantage of operating similar to the srTCM algorithm set forth in RFC2697 when configured with PIR equal to CIR. In such a configuration, a single instance of the algorithm can operate in either single rate or two rate mode depending on the configuration of PIR. The invention has a further advantage of operating as a single rate two color marker when configured with EBS equal to the difference between PBS and CBS, which in turn equals zero, that is, EBS=PBS–CBS=0.

The invention will be described as it may be implemented in an IP internetwork, such as the Internet. However, it should be understood that the invention is not limited to packet traffic streams in an IP network—the details described herein are applicable in other types of networks as well, such as cell-switched networks. For ease of explanation, the invention will be described in the context of an IP internetwork.

With reference to FIG. 1, an embodiment of the invention 100 will now be described. In this example, a meter operates in a network device, such as a switch or router, and sets its mode to color-aware, in which the meter assumes that any packet received at the network device as part of an information or traffic stream has already been colored ("precolored") by a preceding, or up-stream, device as one of green, yellow or red.

In addition to setting its mode, the meter fills a token bucket, C, with tokens Tc at 105. The maximum size of token bucket C, that is, the maximum number of tokens Tc that the bucket can hold, equals a committed burst size (CBS), which typically is measured in bytes. Additionally, the meter sets a rate at which token bucket C can be filled with tokens to the committed information rate (CIR).

The meter initializes, or fills, another token bucket, E, with tokens Te at 105. The maximum size of the token bucket E is an excess burst size (EBS), also measured in bytes. The meter sets two rates at which token bucket E can be filled with tokens: the bucket can be filled with tokens at CIR (only when Tc=CBS) as well as at an excess information rate (EIR) (regardless of whether Tc=CBS). These two rates of fill can be applied at the same time, so that the effective rate at which token bucket E is filled with tokens Te is the peak information rate (PIR), where PIR equals the sum of CIR and EIR, and when Tc=CBS. When Te is less than CBS, then the effective rate at which token bucket E can be filled with tokens Te is EIR, where EIR equals the difference of PIR less CIR.

While the embodiment of the invention described thus far suggests the token buckets C and E are initialized as full of tokens, it is appreciated that, alternatively, the token buckets can be initialized as empty. For example, in one embodiment, a token bucket can be implemented in a data structure that is initialized to a maximum number of tokens, indicating the token bucket is loaded with tokens, or it may be implemented in a data structure that is initialized to some number of tokens less than a maximum number, such as zero, indicating the token bucket is empty of tokens. In either case, token buckets can be incremented or decremented to indicate the use or availability of tokens in the token buckets without departing from the invention.

Returning to FIG. 1, at 110, the meter continually updates the token counts Tc when Tc is less than CBS and Te when Tc is full and Te is less than EBS. These tokens are incremented at rate CIR. In particular, if token bucket C is less than full, that is, if the number of tokens Tc in token bucket C is less than CBS, then a token is added to token bucket C. Only when token bucket C is full, and if token bucket E is less than full (i.e., the number of tokens Te in token bucket E is less than EBS), then a token is added to token bucket E. If, both token buckets are full, no tokens are added to either token bucket. It should be noted that while this description contemplates initially setting the token counts to a maximum value, and incrementing the same so that the token counts move toward the maximum value, in another embodiment, the algorithm could be implemented such that the token counts are initialized to zero, an decremented toward zero, without departing from the invention.

At 115, the meter, in parallel with continually updating token count Te at rate CIR when Tc is full and Te is less than EBS, continually updates the token count Te at rate EIR for token bucket E when Te is less than EBS. Note that this update of token bucket E is in addition to adding tokens Te to token bucket E at rate CIR when Tc=CBS as described above. This continual update of token bucket E by filling token bucket E with tokens Te at rate CIR when Tc is less than CBS and filling token bucket E with tokens Te at rate EIR without regard to whether Tc is less than or equal to CBS, causes token bucket E to fill with tokens at rate PIR. (It should be noted that if EIR is greater than zero, the invention provides for a two rate three color marker. However, if EIR equals zero, so that PIR equals CIR, the invention provides for a single rate three color marker. Thus, one instance of an embodiment of the invention can operate in either single rate or two rate mode depending on the configuration of EIR (or PIR)).

In color-aware mode, when a packet arrives at meter at time t (120), the meter then inspects the packet at 125 to determine whether the packet is green and whether token bucket C at time t has enough tokens Tc to process the packet. If the packet is green and the number of bytes, B, in the packet is less than the number of tokens Tc in token bucket C at time t, at 130 the packet is marked green and token bucket C is emptied of B tokens. The embodiment of the invention continues to operate, incrementing token counts for token buckets C and E as may occur until the buckets are full, and waiting for another packet to arrive, as denoted in FIG. 1 by return paths 150 and 155 in the flow diagram.

If at 125 the packet is not green or the packet size exceeds the number of tokens in token bucket C at time t, an embodiment of the invention determines at 135 whether the packet is green or yellow and whether the token bucket E at time t has enough tokens Te to process the packet. If the packet is green or yellow and the number of bytes, B, in the packet is less than the number of tokens Te in token bucket E at time t, at 140 the packet is declared yellow and token bucket E is decremented by B tokens. The embodiment of the invention continues to operate, incrementing token counts for token buckets C and E as may occur until the buckets are full, and waiting for another packet to arrive.

It should be noted that if EBS is configured at zero, then token bucket E has no tokens, since the maximum number of tokens in token bucket E is initialized at 105 equal to EBS. Thus, in this configuration, the color marker operates as a single rate, two color marker, in which received packets are marked green if precolored green and the packet size doesn't exceed the number of tokens in token bucket C, or marked red otherwise since token bucket E is empty, that is, it has no tokens Te.

If the tests at 125 and 135 fail, that is, if the packet is not green or yellow, or if it is green but the packet size exceeds the number of available tokens in either token bucket C or E at time t, or if the packet is yellow but the packet size exceeds the number of available tokens in token bucket E at time t, at 145 the packet is marked red. The embodiment of the invention continues to operate, incrementing token counts for token buckets C and E as may occur until the buckets are full, and waiting for another packet to arrive. Thus, it should be noted that the process of metering and marking packets as discussed above and as set forth at 120–140 in FIG. 1, occurs as a separate but parallel process with the token bucket filling processes 110 and 115 described above.

Earlier it was noted that one embodiment of the invention initially sets the token counts to a maximum value, and if at a point in time the token counts are less than the maximum value, incrementing the same so that the token counts move toward the maximum value, while in another embodiment, the algorithm could be implemented in such a way that the token counts are initialized to zero and thereafter decremented toward zero if at some point in time t the token counts are greater than zero, without departing from the invention. So too the process described at 120–140 can be implemented so that the token counts Tc and Te are incremented by the number of bytes in a received packet, rather than decremented, without departing from the invention.

It should be appreciated by one of ordinary skill in the art that the embodiments of the invention as described above can be extended to more token buckets and corresponding packets of different colors, that is, more categories of drop precedence, or more levels of assurance. For example, assume a third token bucket G, with a corresponding token count, Tg, burst size GBS, and information rate, GIR, where GBS stands for any burst size other than the committed or excess burst size, and GIR stands for any information rate other than the committed and excess information rate. For the sake of this example, assume G stands for "general". Assume further a fourth packet color of, say, orange. The process, according to one embodiment of the invention, is as follows:

Start:
    token buckets C, E, and G are full of tokens Tc, Te and Tg, wherein Tc=CBS, Te=EBS and Tg=GBS, respectively, at time 0;

Thereafter, token counts Tc, Te and Tg are updated CIR times per second as follows:
    if Tc<CBS, Tc=Tc+1, else,
    if Te<EBS, Te=Te+1, else,
    if Tg<GBS, Tg=Tg+1, else,
    none of Tc, Te and Tg is incremented;

and token counts Te and Tg are updated EIR times per second as follows:
    if Te<EBS, Te=Te+1, else,
    if Tg<GBS, Tg=Tg+1;

and token count Tg is updated GIR times per second as follows:
    if Tg<GBS, Tg=Tg+1.

When a packet arrives of size B bytes at time t, in color-aware mode, the meter operates as follows:
    if received packet is green and if Tc(t)−B>=0, packet is green and Tc=Tc−B>=0, else
    if received packet is green or yellow and if Te(t)−B>=0, packet is yellow and Te=Te−B>=0, else
    if received packet is green or yellow or orange and Tg(t)−B>=0, packet is orange and Tg=Tg−B>=0, else
    packet is red and none of Tc, Te and Tg is decremented.

Figure 2:
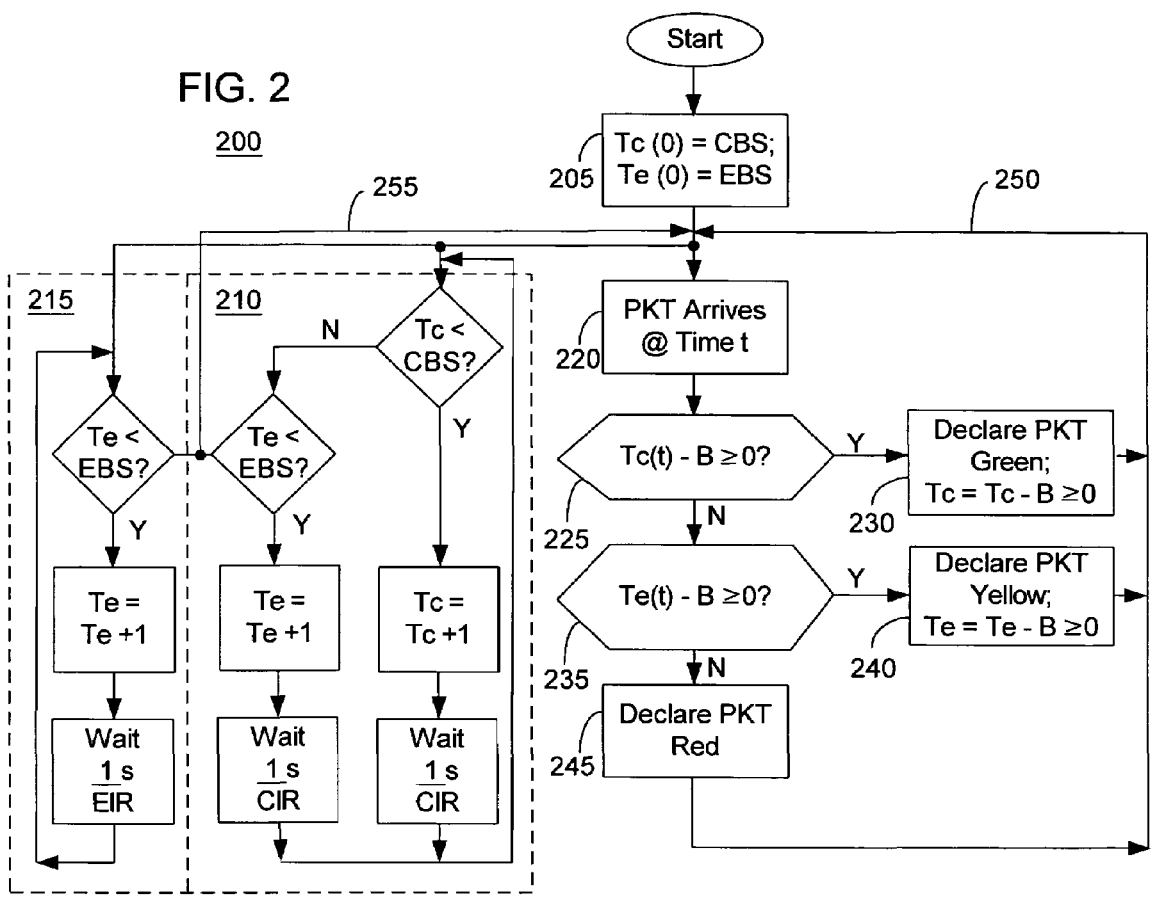
FIG. 2 provides a flow diagram of an embodiment of the invention.

Thus far, the embodiments of the invention described above illustrate the operation of a color marker in color-aware mode. With reference to FIG. 2, an embodiment of the invention 200 is described illustrating the operation of a color marker in color-blind mode. In this embodiment, a meter operates in a network device, such as a switch or router, and sets its mode to color-blind, in which the meter assumes that any packet received at the network device as part of an information or traffic stream uncolored.

In addition to setting its mode, the meter initializes token buckets C and E just as described above with reference to the embodiment of the invention in which the meter is configured in color-aware mode. Thus, the meter fills a token bucket, C, with tokens Tc at 205 with a maximum number of tokens Tc that the token bucket can hold, equal to a committed burst size (CBS) measured in bytes. Additionally, the meter sets a rate at which token bucket C can be filled with tokens to the committed information rate (CIR). The meter also initializes token bucket E with a maximum number (EBS) of tokens Te at 205. The meter sets two rates at which token bucket E can be filled with tokens at the same time: CIR (only when Tc=CBS) as well as EIR (regardless of whether Tc=CBS).

In FIG. 2 at 210, the meter continually updates the token count Tc when Tc<CBS and token count Te when Tc=CBS and Te<EBS at rate CIR, just as described in the color-aware embodiment of the invention. At 215, the meter, in parallel with incrementing token count Te at rate CIR when Tc=CBS and Te<EBS, continually increments token count Te at rate EIR for token bucket E when Te<EBS. It should be noted that if EIR>0, the invention provides for a two rate three color marker. However, if EIR=0, so that PIR=CIR, the invention provides for a single rate three color marker. Thus, one instance of this embodiment of the invention can operate in either single rate or two rate mode depending on the configuration of EIR (or PIR)).

In color-blind mode, when a packet of size B bytes arrives at the meter at time t (220), the meter then checks at 225 whether token bucket C has enough tokens to process the packet, and if so, at 230 colors the packet green and decrements the number of tokens in token bucket C by the number of bytes in the packet. If the meter determines the token bucket C does not have enough tokens to process the packet, that is, the number of tokens in token bucket C at time t less B bytes is less than zero, then at 235 the meter checks whether token bucket E has enough tokens to process the packet. If so, at 240, the meter colors the packet yellow and decrements the number of tokens in the token bucket E by the number of bytes in the packet. If both token buckets C and E do not have enough tokens to process the received packet, the packet is colored red at 245 and the number of tokens is not decremented in either token bucket. The embodiment of the invention continues to operate, incrementing token counts for token buckets C and E as may occur until the buckets are full, and waiting for another packet to arrive, as denoted by return paths 250 and 255 in FIG. 2.

It should be noted that reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. Some portions of the detailed description are presented, for example, in terms of algorithms and symbolic representations of operations on data within a computer memory.

These algorithmic descriptions and representations are the means used by those skilled in the data processing arts to most effectively convey the substance of their work to others skilled in the art.

An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as binary digits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.), or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. In addition, the present invention is not described with reference to any particular programming language. It will be appreciated that a variety of programming languages may be used to implement the teachings of the invention as described herein.

What is claimed is:

1. A method comprising:
incrementing a value of a first indicator by one at a first rate if the value of the first indicator is less than a first value;
incrementing a value of a second indicator by one at the first rate if the value of the first indicator equals the first value and the value of the second indicator is less than a second value;
incrementing the value of the second indicator by one at a second rate if the value of the second indicator is less than the second value;
receiving a packet, hereafter "the received packet", marked according to a level of assurance; and
decrementing the value of the first indicator by a value indicating the length of the received packet if 1) the received packet marked according to a level of assurance has been marked according to a first level of assurance and 2) the value of the first indicator less the value indicating the length of the received packet is greater than or equal to zero, else decrementing the value of the second indicator by the value indicating the length of the received packet and marking the received packet according to a second level of assurance if 1) the received packet marked according to a level of assurance has been marked according to the first level of assurance or the second level of assurance, and 2) the value of the second indicator less the value indicating the length of the received packet is greater than or equal to zero, else marking the received packet according to a third level of assurance.

2. The method of claim 1, wherein the second rate and the second value each equal zero.

3. The method of claim 1, wherein the first indicator is a first token bucket C and the first value a committed burst size (CBS), and wherein incrementing the value of the first indicator by one at a first rate if the value of the first indicator is less than the first value comprises incrementing a number of tokens in C by one at a committed information rate (CIR) if the number of tokens in C is less than CBS.

4. The method of claim 3, wherein the second indicator is a second token bucket, E, and the second value an excess burst size (EBS) and wherein incrementing the value of the second indicator by one at the first rate if the value of the first indicator equals the first value and the value of the second indicator is less than the second value comprises incrementing a number of tokens in E by one at the CIR if the number of tokens in C equals CBS and the number of tokens in E is less than EBS.

5. The method of claim 4, wherein incrementing the value of the second indicator by one at a second rate if the value of the second indicator is less than the second value comprises incrementing the number of tokens in E by one at EIR if E is less than EBS.

6. The method of claim 1, wherein receiving a packet marked according to a level of assurance comprises receiving a packet marked according to a profile.

7. The method of claim 6, wherein receiving a packet marked according to a level of assurance comprises receiving a packet marked green to indicate the first level of assurance, marked yellow to indicate the second level of assurance, and marked red to indicate the third level of assurance.

8. The method of claim 7, wherein the packet is an Internet Protocol (IP) packet and the IP packet is marked one of green, yellow and red by coding a DiffServ field of the IP packet.

9. The method of claim 8, wherein coding a DiffServ field of the IP packet comprises coding a DiffServ field of the IP packet in a per hop behavior (PHB) specific manner.

10. The method of claim 7 wherein decrementing the value of the first indicator by a value indicating the length of the received packet if 1) the received packet marked according to a level of assurance has been marked according to a first level of assurance and 2) the value of the first indicator less the value indicating the length of the received packet is greater than or equal to zero, comprises decrementing the number of tokens in C by the number of bytes in the received packet if 1) the received packet has been marked green and 2) the number of tokens in C less the number of bytes in the received packet is greater than or equal to zero.

11. The method of claim 10 wherein decrementing the value of the second indicator by the value indicating the length of the received packet and marking the received packet according to a second level of assurance if 1) the received packet marked according to a level of assurance has been marked according to the first level of assurance or the second level of assurance, and 2) the value of the second indicator less the value indicating the length of the received packet is greater than or equal to zero, comprises decrementing the number of tokens in E by the number of bytes in the received packet and marking the received packet yellow if 1) the received packet has been marked green or yellow, and 2) the number of tokens in E less the number of bytes in the received packet is greater than or equal to zero.

12. The method of claim 11, wherein marking the received packet according to a third level of assurance comprises marking the received packet red.

13. The method of claim 1, wherein incrementing the value of the second indicator by one at a second rate if the value of the second indicator is less than the second value comprises incrementing the value of the second indicator by one at the second rate if the second rate is greater than zero and the second indicator is less than the second value.

14. The method of claim 1, wherein the first value is greater than zero.

15. The method of claim 1, wherein the first value is equal to or greater than a maximum packet size.

16. The method of claim 15, wherein the second value is greater than zero.

17. The method of claim 15, wherein the second value is equal to or greater than a maximum packet size.

18. An article of manufacture, comprising: a machine accessible medium, the machine accessible medium providing instructions, that when executed by a machine, cause the machine to perform the process in claim 1.

19. The article of manufacture in claim 18, further comprising: a machine accessible medium, the machine accessible medium providing instructions, that when executed by a machine, cause the machine to perform the process in claim 2.

20. The article of manufacture in claim 18, further comprising: a machine accessible medium, the machine accessible medium providing instructions, that when executed by a machine, cause the machine to perform the process in claim 3.

21. The article of manufacture in claim 20, further comprising: a machine accessible medium, the machine accessible medium providing instructions, that when executed by a machine, cause the machine to perform the process in claim 4.

22. The article of manufacture in claim 21, further comprising: a machine accessible medium, the machine accessible medium providing instructions, that when executed by a machine, cause the machine to perform the process in claim 5.

23. The article of manufacture in claim 18, further comprising: a machine accessible medium, the machine accessible medium providing instructions, that when executed by a machine, cause the machine to perform the process in claim 6.

24. The article of manufacture in claim 23, further comprising: a machine accessible medium, the machine accessible medium providing instructions, that when executed by a machine, cause the machine to perform the process in claim 7.

25. The article of manufacture in claim 24, further comprising: a machine accessible medium, the machine accessible medium providing instructions, that when executed by a machine, cause the machine to perform the process in claim 8.

26. The article of manufacture in claim 25, further comprising: a machine accessible medium, the machine accessible medium providing instructions, that when executed by a machine, cause the machine to perform the process in claim 9.

27. The article of manufacture in claim 23, further comprising: a machine accessible medium, the machine accessible medium providing instructions, that when executed by a machine, cause the machine to perform the process in claim 10.

28. The article of manufacture in claim 27, further comprising: a machine accessible medium, the machine accessible medium providing instructions, that when executed by a machine, cause the machine to perform the process in claim 11.

29. The article of manufacture in claim 18, further comprising: a machine accessible medium, the machine accessible medium providing instructions, that when executed by a machine, cause the machine to perform the process in claim 12.

30. The article of manufacture in claim 18, further comprising: a machine accessible medium, the machine accessible medium providing instructions, that when executed by a machine, cause the machine to perform the process in claim 13.

31. The article of manufacture in claim 18, further comprising: a machine accessible medium, the machine accessible medium providing instructions, that when executed by a machine, cause the machine to perform the process in claim 14.

32. The article of manufacture in claim 18, further comprising: a machine accessible medium, the machine accessible medium providing instructions, that when executed by a machine, cause the machine to perform the process in claim 15.

33. The article of manufacture in claim 32, further comprising: a machine accessible medium, the machine accessible medium providing instructions, that when executed by a machine, cause the machine to perform the process in claim 16.

34. The article of manufacture in claim 32, further comprising: a machine accessible medium, the machine accessible medium providing instructions, that when executed by a machine, cause the machine to perform the process in claim 17.

35. A method comprising:
updating a first counter C and a second counter E at a first rate by:
monotonically incrementing C if C is less than a committed burst size CBS, else
monotonically incrementing E if E is less than an excess burst rate EBS; else
incrementing neither C nor E;
updating E at a second rate by monotonically incrementing E if E is less than EBS; and
when receiving a packet of size N data units:
if the packet has a first marking and C minus N is greater than or equal to zero, maintaining the packet's first marking and decrementing C by N, else
if the packet has a first or second marking and E minus N is greater than or equal to zero, changing to or maintaining the packet's second marking and decrementing E by N, else
changing to a third marking for the packet and decrementing neither C nor E.

36. The method of claim 35, wherein the first, second and third markings of a packet respectively comprise the colors green, yellow and red.

37. A method comprising:
initializing a first counter, C, having a range from zero to a number of data units in a committed burst size, hereafter CBS, to zero;
initializing a second counter, E, having a range from zero to a number of data units in an excess burst size, hereafter EBS, to zero;
updating C and E at a first rate by:
monotonically decrementing C if C is greater than zero, else
monotonically decrementing E if E is greater than zero; else
decrementing neither C nor E;
updating E at a second rate by monotonically decrementing E if E is greater than zero; and
upon receiving a packet of size N data units:
if the packet has a first marking and C plus N is less than or equal to CBS, maintaining the packet's first marking and incrementing C by N, else
if the packet has a first or second marking and E plus N is less than or equal to EBS, changing to or maintaining the packet's second marking and incrementing E by N, else
changing to a third marking for the packet and incrementing neither C nor E.

38. In a metering device having a token bucket, t1, with a rate, r1, and a maximum number of tokens, m1, and a token bucket, t2, with two rates, r1, and r2, and a maximum number of tokens, m2, a method comprising:
- monotonically incrementing the number of tokens in t1 at rate r1 if t1 has less than m1 tokens;
- monotonically incrementing the number of tokens in t2 at rate r1 if t1 has m1 tokens and t2 has less than m2 tokens;
- monotonically incrementing the number of tokens in t2 at rate r2 if t2 has less than m2 tokens; and
- when receiving a packet of size s data units:
  - if the packet is marked according to a first marking, p1, and t1 has at least s tokens, maintaining the packet's marking as p1 and decrementing the number of tokens in t1 by s, else
  - if the packet is marked according to one of a first and a second marking, p1 and p2, and t2 has at least s tokens, maintaining the packet's marking as p2 and decrementing t2 by s, else maintaining the packet's marking as other than one of p1 and p2.

39. The method of claim 38, wherein monotonically incrementing the number of tokens in t2 at rate r2 if t2 has less than m2 tokens comprises monotonically incrementing the number of tokens in t2 at rate r2 if r2 is greater than zero and t2 has less than m2 tokens.

40. The method of claim 38, wherein m1 is greater than zero.

41. The method of claim 38, wherein m1 is equal to or greater than a maximum packet size.

42. The method of claim 38, wherein m2 is greater than zero.

43. The method of claim 38, wherein m2 is equal to or greater than a maximum packet size.

44. The method of claim 38, wherein m2 is equal to zero.

45. In a packet metering and monitoring device having a green token bucket (Tg) with a committed information rate (CIR) and a maximum number of tokens equal to a committed burst size (CBS), and a yellow token bucket (Ty) with a committed information rate (CIR), an excess information rate (EIR) and a maximum number of tokens equal to an excess burst size (EBS), a method comprising:
- incrementing by one the number of tokens in Tg at rate CIR if Tg has less than CBS tokens;
- incrementing by one the number of tokens in Ty at rate CIR if Tg has CBS tokens and Ty has less than EBS tokens;
- incrementing by one the number of tokens in Ty at rate EIR if Ty has less than EBS tokens; and
- when receiving at the packet metering and monitoring device a packet of size s data units, if the packet is colored green, and Tg has at least s tokens, decrementing the number of tokens in Tg by s, else if the packet is colored green or yellow, and Ty has at least s tokens, coloring the packet yellow and decrementing Ty by s, else coloring the packet red.

46. A method comprising:
- initializing a first counter, C, to a number of data units in a committed burst size, hereafter CBS;
- initializing a second counter, E, to a number of data units in an excess burst size, hereafter EBS;
- initializing a third counter, G, to a number of data units in a general burst size, hereafter GBS;
- updating C, E and G at a first rate by, monotonically incrementing C if C is less than CBS, else monotonically incrementing E if E is less than EBS, else monotonically incrementing G if G is less than GBS, else incrementing none of C, E and G;
- updating E and G at a second rate by monotonically incrementing E if E is less than EBS, else monotonically incrementing G if G is less than GBS, else incrementing neither of E nor G, updating G at a third rate by monotonically incrementing G if G is less than GBS; and
- when receiving a packet of size N data units:
  - if the packet has a first marking and C minus N is greater than or equal to zero, maintaining the packet's first marking and decrementing C by N, else
  - if the packet has a first or second marking and E minus N is greater than or equal to zero, changing to or maintaining the packet's second marking and decrementing E by N, else
  - if the packet has a second or third marking and G minus N is greater than or equal to zero, changing to or maintaining the packet's third marking and decrementing G by N, else
  - changing to a fourth marking for the packet and decrementing none of C, E and G.

47. An article of manufacture, comprising: a machine accessible medium, the machine accessible medium providing instructions, that when executed by a machine, cause the machine to perform the process in claim 46.

48. A method comprising:
- updating a first counter C and a second counter E at a first rate by:
  - monotonically incrementing C if C is less than a committed burst size CBS, else
  - monotonically incrementing E if E is less than an excess burst rate EBS; else
  - incrementing neither C nor E;
- updating E at a second rate by monotonically incrementing E if E is less than EBS; and
- when receiving a packet of size N data units:
  - if C minus N is greater than or equal to zero, marking the packet according to a first marking and decrementing C by N, else
  - if E minus N is greater than or equal to zero, marking the packet according to a second marking and decrementing E by N, else
  - marking the packet according to a third marking and decrementing neither C nor E.

49. The method of claim 48, wherein the first, second and third markings of a packet respectively comprise the colors green, yellow and red.

50. An article of manufacture, comprising: a machine accessible medium, the machine accessible medium providing instructions, that when executed by a machine, cause the machine to perform the process in claim 48.

51. The article of manufacture in claim 50, further comprising: a machine accessible medium, the machine accessible medium providing instructions, that when executed by a machine, cause the machine to perform the process in claim 49.

* * * * *